United States Patent [19]

Kotera et al.

[11] 3,890,302

[45] June 17, 1975

[54] DEXTRO 1-METHYL-2-(2-NAPHTHYL) AZIRIDINE

[76] Inventors: Katsumi Kotera, 1631, Hirose, Shimamoto-cho, Osaka; Keizo Kitahonoki, 848, Nabata, Ikoma-cho, Ikoma; Ryonosuke Kido, 3-16-28, Chokoji-minami, Osaka, all of Japan

[22] Filed: June 5, 1972

[21] Appl. No.: 259,839

Related U.S. Application Data

[63] Continuation-in-part of Ser. No. 6,307, Jan. 27, 1970, abandoned.

[30] Foreign Application Priority Data

Jan. 28, 1969 Japan.................................. 44-6147

[52] U.S. Cl......... 260/239 E; 260/457; 260/501.17; 260/570.5 R; 260/570.6; 424/244
[51] Int. Cl............................................ C07d 23/06
[58] Field of Search .................................. 260/239 E

[56] References Cited
UNITED STATES PATENTS

| | | | |
|---|---|---|---|
| 3,586,666 | 6/1971 | Kitahonoki et al.............. | 260/239 E |
| 3,629,239 | 12/1971 | Kitahonoki et al.............. | 260/239 E |

FOREIGN PATENTS OR APPLICATIONS

| | | | |
|---|---|---|---|
| 816,857 | 7/1959 | United Kingdom............ | 260/DIG. 8 |

OTHER PUBLICATIONS

Ohtsuru et al., J. Mol. Spectroscopy, Vol. 27, pages 296–303 (1968).
Weissberger, The Chemistry of Heterocyclic Compounds, Vol. 19, Part one (Interscience, New York, 1964), pages 528, 529, 533–535. QD 400 W4.

*Primary Examiner*—Alton D. Rollins
*Attorney, Agent, or Firm*—Wenderoth, Lind & Ponack

[57] ABSTRACT

Racemic 1-methyl-2-(2-naphthyl)aziridine, being useful as a tranquilizer, is prepared via three routes: (a) halogenation of the corresponding aminoalcohol and treatment of the resulting haloamine with an alkali; (b) treatment of the corresponding aminoalcohol with sulfuric acid and treatment of the resulting hydrogen sulfate with an alkali; and (c) treatment of 2-(2-naphthyl)aziridine with an oxonium methylating agent. Dextro-1-methyl-2-(2-naphthyl)aziridine, being more potent in the tranquilizing activity than the racemate, is prepared by optical resolution of racemic 2-(2-naphthyl)-2-methylaminoethanol with levo-tartaric acid, treatment of the resulting dextro-2-(2-naphthyl)-2-methylaminoethanol levo-tartrate with an alkali, treatment of the resulting dextro-2-(2-naphthyl)-2-methylaminoethanol with a halogenating agent and treatment of the resulting levo-N-methyl-2-halogeno-1-(2-naphthyl)ethylamine with an alkali.

1 Claim, No Drawings

DEXTRO 1-METHYL-2-(2-NAPHTHYL) AZIRIDINE

This application is a continuation-in-part of U.S. application Ser. No. 6,307, filed Jan. 27, 1970, now abandoned.

The present invention relates to a process for the production of racemic 1-methyl-2-(2-naphthyl)aziridine and its dextro compound, which are useful as tranquilizers.

Accordingly, a basic object of the present invention is to embody a process for preparing racemic 1-methyl-2-(2-naphthyl)aziridine (I). Another object of this invention is to embody a process for preparing dextro-1-methyl-2-(2-naphthyl)aziridine (I'). A further object of the invention is to embody dextro-1-methyl-2-(2-naphthyl)aziridine (I') being useful as a tranquilizer. These and other objects will be apparent to those conversant with the appurtenant art from the following description of the general class of compounds and the several specific examples and methods of obtaining them presented.

According to the present invention, racemic 1-methyl-2-(2-naphthyl)aziridine (I) can be prepared by three routes:

1. treating 1-(2-naphthyl)-2-methylaminoethanol (II) or 2-(2-naphthyl)-2-methylaminoethanol (II') with a halogenating agent and treating the resulting N-methyl-2-halogeno-2-(2-naphthyl)ethylamine (III) or N-methyl-2-halogeno-1-(2-naphthyl)-ethylamine (III') with an alkali (Route A);
2. treating 1-(2-naphthyl)-2-methylaminoethanol (II) or 2-(2-naphthyl)-2-methylaminoethanol (II') with sulfuric acid and treating the resulting 1-(2-naphthyl)-2-methylaminoethyl hydrogen sulfate (IV) or 2-(2-naphthyl)-2-methylaminoethyl hydrogen sulfate (IV') with an alkali (Route B); and
3. treating 2-(2-naphthyl)aziridine (V) with an oxonium methylating agent (Route C). Further, dextro-1-methyl-2-(2-naphthyl)aziridine (I') can be prepared by treating racemic 2-(2-naphthyl)-2-methylaminoethanol (II') with levo-tartaric acid for optical resolution, treating the resulting dextro-2-(2-naphthyl)-2-methylaminoethanol levo-tartrate (II'') with an alkali, treating the resulting dextro-2-(2-naphthyl)-2-methylaminoethanol (II''') with a halogenating agent, and treating the resulting levo-N-methyl-2-halogeno-1-(2-naphthyl)ethylamine (III'') with an alkali (Route D).

ROUTE A

The halogenation may be favorably effected in the presence or absence of an inert solvent (e.g., benzene, carbon tetrachloride, chloroform, dioxane, diglyme, tetrahydrofuran, their mixture) in the range of temperature from 0°C to the boiling point of the solvent used or that of the halogenating agent. Examples of the halogenating agent are phosphorus trichloride, phosphorus tribromide, phosphoryl chloride, thionyl chloride, thionyl bromide, phosphorus pentachloride, and phosphorus pentabromide. The starting 1-(2-naphthyl)-2-methylaminoethanol (II) or 2-(2-naphthyl)-2-methylaminoethanol (II') can be prepared by treating 2-(2-naphthyl)oxirane or the corresponding 2-naphthyl-halogenoethanol with methylamine.

The treatment with an alkali may be favorably effected in an inert solvent in the range of temperature from room temperature to the boiling point of the solvent used. Examples of the solvent are water, methanol, ethanol, n-propanol, isopropanol, acetone, methyl ethyl ketone, chloroform, benzene, ether, tetrahydrofuran, their mixture, etc. Examples of the alkali are alkali hydroxide (e.g., sodium hydroxide, potassium hydroxide), alkali carbonate (e.g., sodium carbonate, potassium carbonate), alkali bicarbonate (e.g., sodium bicarbonate, potassium bicarbonate), alkali alkoxide (e.g., sodium methoxide, potassium ethoxide), and alkali salt of organic acid (e.g., sodium acetate, potassium acetate).

ROUTE B

The treatment with sulfuric acid may be effected in the range of temperature from 0°C to 200°C without solvent.

The treatment with an alkali may be effected quite similarly to that of Route A.

ROUTE C

The treatment with an oxonium methylating agent may be effected in an inert solvent (e.g., diglyme, monoglyme, tetrahydrofuran, ether, dioxane, tetrahydropyran) in the range of temperature from 0°C to 100°C. Examples of the oxonium methylating agent are trimethyloxonium fluoroborate, trimethyloxonium hexachlorostannate, and trimethyloxonium tetrachloroaluminate. The starting 2-(2-naphthyl)aziridine (V) can be prepared, for example, by treating 1-(2-naphthyl)-1-hydroxyiminoethane or 2-(2-naphthyl)-1-hydroxyiminoethane with lithium aluminum hydride in tetrahydrofuran. This route is successfully finished by treating the resulting quaternary salt with a base (e.g., lithium aluminum hydride, sodium ethoxide, sodium carbonate, potassium carbonate, sodium borohydride).

ROUTE D

The optical resolution may be effected by treating racemic 2-(2-naphthyl)-2-methylaminoethanol with its equimolecular amount of levo-tartaric acid in an inert solvent (e.g., methanol, ethanol, tetrahydrofuran, benzene, chloroform) in the range of temperature from room temperature to the boiling point of the solvent. Then, the resulting levo-tartrate (II'') is treated with an alkali (e.g., sodium carbonate, potassium bicarbonate) in an inert solvent (e.g., water, methanol, benzene, acetone), whereby dextro-2-(2-naphthyl)-2-methylaminoethanol (II''') can be obtained successfully.

The halogenation may be effected quite similarly to that of Route A. Then, the resultant levo-N-methyl-2-halogeno-1-(2-naphthyl)ethylamine (III'') may be treated with an alkali quite similarly to that of Route A.

The racemic 1-methyl-2-(2-naphthyl)aziridine (I) and dextro-1-methyl-2-(2-naphthyl)aziridine (I') are useful as tranquilizers. The pharmacological activities of these compounds are shown in the following table.

Table

| Test Compound | Potentiated narcosis* | Conditioned reflex** | Catalepsy*** |
| --- | --- | --- | --- |
| Chlorpromazine | 1.1 | 0.64 | 4.7 |
| racemic-1-methyl-2-(2-naphthyl)-aziridine | 14.6 | 0.94 | 51.0 |

Table-Continued

| Test Compound | Potentiated narcosis* | Conditioned reflex** | Catalepsy*** |
| --- | --- | --- | --- |
| dextro-1-methyl-2-(2-naphthyl)-aziridine | 10.5 | 0.27 | 38.0 |
| Chlordiazepoxide | 20.0 | 16.50 | — |

*Potentiating narcosis is observed by administering a test compound subcutaneously to mice, administering 10 minutes later 35 mg/kg of sodium thiopental intravenously to the mice and examining the extent of narcosis over 10 minutes. The result is shown by $ED_{50}$ mg/kg [Gairndt: Arch.t.exp.u.Pharmacol., vol. 164, 118 (1932)].
**Conditioned reflex is observed by administering a test compound subcutaneously to rats and examining Sidman's avoidance, and it is represented by an effective dose ($ED_{50}$ mg/kg) [Sidman: Science, vol. 118, 157–158 (1953)].
***Catalepsy is observed by administering a test compound subcutaneously to rats, examining 120 min. after the extent of catalepsy over 30 seconds while keeping rat legs on four corks, and the result is shown by $ED_{50}$ mg/kg [Winth et al.: Arch.int.Pharmacody. vol. 115, 1–31 (1958)].

Further, acute toxicity of these compounds are as follows: racemic 1-methyl-2-(2-naphthyl)aziridine (I), $LD_{50}$ 188.0 mg/kg; dextro-1-methyl-2-(2-naphthyl)aziridine (I'), $LD_{50}$ 183.6 mg/kg, each by subcutaneous administration to mice.

Note: Acute toxicity ($LD_{50}$) is determined as follows: A test compound is applied subcutaneously to mice in different single doses. For each dose 10 mice were used, their weight ranging from 15 to 17 grams. The mice were observed for 24 hours after the administration of the compound. The $LD_{50}$ is calculated by graphic interpolation from two doses actually used, one of which kills less than half and the other more than half the number of mice treated (Schleicher and Schull probability graphic paper 298 ½ is used for the graphic interpolation).

Accordingly, racemic 1-methyl-2-(2-naphthyl)aziridine (I) and dextro-1-methyl-2-(2-naphthyl)aziridine (I') exhibit an excellent tranquilizing activity with lower unfavorable effects (e.g., extrapyramidal symptoms, muscle relaxation, dizziness) in comparison with chlorpromazine.

The racemic 1-methyl-2-(2-naphthyl)aziridine (I) or dextro-1-methyl-2-(2-naphthyl)aziridine (I') may be administered in combination with pharmaceutically acceptable carriers, the choice of which is determined by the preferred route of administration, the solubility of the substance and standard pharmaceutical practice. Examples of pharmaceutical preparations are capsules, suspensions and solutions.

The compositions containing the racemic 1-methyl-2-(2-naphthyl)aziridine (I) or dextro-1-methyl-2-(2-naphthyl)aziridine (I') may be dispensed in dosage unit forms for a single daily therapeutic dose or in smaller units for multiple doses or in larger units for division into single doses. In general, the dosage of these substances is of approximately the same order of magnitude as that of chlorpromazine. These substances are useful to treat the type of psychoneurosis.

EXAMPLE 1 a. To a solution of 1-(2-naphthyl)-2-methylaminoethanol [m.p. 110° to 110.5°C](7.31 g) in chloroform (150 ml), thionyl chloride (28.0 g) is added with cooling and stirring, and the resultant mixture is stirred at room temperature for 4 hours. The precipitated crystals are filtered and recrystallized from methanol/acetone to give N-methyl-2-chloro-2-(2-naphthyl)ethylamine hydrochloride (7.4 g) as crystals melting at 181°C (decomp.).

b. To a solution of potassium hydroxide (30 g) in methanol (100 ml), N-methyl-2-chloro-2-(2-naphthyl)ethylamine hydrochloride (30 g) is added, and the resultant mixture is refluxed for 2 hours. The reaction mixture is concentrated, combined with water and shaken with ether. The ether layer is washed with water, dried over anhydrous potassium carbonate and evaporated to remove the ether. The light yellow oil (5.2 g) is distilled under reduced pressure to give a distillate (2.468 g) boiling at 109°C/8 mm Hg. This substance is crystallized soon and recrystallized from petroleum ether to give crystals melting at 48° to 51°C. The crystals are still purified by the alumina chromatography to give 1-methyl-2-(2-naphthyl)aziridine (1.121 g) as crystals melting at 50° to 51°C.

EXAMPLE 2

Similarly to Example 1, 2-(2-naphthyl)-2-methylaminoethanol [m.p. 73 to 74°C] is treated with thionyl chloride to give N-methyl-2-chloro-2-(2-naphthyl)ethylamine, which is then treated with a methanolic solution of potassium hydroxide to give 1-methyl-2-(2-naphthyl)aziridine as crystals melting at 50° to 51°C.

EXAMPLE 3 a. To a suspension of 1-(2-naphthyl)-2-methylaminoethanol (504 mg) in water (6 ml), conc. sulfuric acid (256 mg) is added dropwise with ice cooling and stirring, and the resultant mixture is heated at 128°C for 2 hours. The reaction mixture is concentrated under reduced pressure to give 1-(2-naphthyl)-2-methylaminoethyl hydrogen sulfate (759 mg) as a light yellow oil.

b. To a solution of 1-(2-naphthyl)-2-methylaminoethyl hydrogen sulfate (759 mg) in water (6 ml), a solution of sodium hydroxide (1 g) in water (5 ml) is added with ice cooling, and the resultant mixture is heated on a boiling bath for half an hour. The reaction mixture is shaken with water and dried over dry potassium carbonate. The chloroform is evapaorated, and the light yellow residue (463 mg) is chromatographed on a column of alumina (15 g) containing 3 percent water. The ether fraction affords 1-methyl-2-(2-naphthyl)aziridine (107 mg) as a light yellow oil, which is crystallized to give crystals melting at 50° to 51°C.

EXAMPLE 4

Similarly to Example 3, 2-(2-naphthyl)-2-methylaminoethanol [m.p. 73° to 74°C] is treated with conc. sulfuric acid to give 2-(2-naphthyl)-2-methylaminoethyl hydrogen sulfate, which is then treated with a methanolic solution of potassium hydroxide to give 1-methyl-2-(2-naphthyl)aziridine as crystals melting at 50° to 51°C.

EXAMPLE 5

A solution of 2-(2-naphthyl)aziridine (170 mg) in monoglyme (2 ml) is added to a solution of trimethyloxonium fluoroborate (220 mg) in monoglyme (3 ml) with ice cooling and stirring. The resultant mixture is kept at 0°C for half an hour and added gradually to a suspension of lithium aluminum hydride (300 mg) in monoglyme (2 ml) cooled in a dry ice/acetone bath. The mixture is stirred at 0°C for 2 hours, stirred at room temperature for an hour, diluted with an amount of ether, cooled with ice, mixed with water to decompose the lithium aluminum hydride and filtered. The filtrate is evaporated under reduced pressure, and the residue (150 mg) is analyzed by the gas chromatography, whereby 1-methyl-2-(2-naphthyl)aziridine is produced in about 45 percent of yield.

EXAMPLE 6 a. A mixture of racemic 2-(2-naphthyl)-2-methylaminoethanol (16.2 g) and its equimolecular amount of levo-tartaric acid is dissolved with heating in methanol. Recrystallization is repeated several times, whereby dextro-2-(2-naphthyl)-2-methylaminoethanol levo-tartrate is obtained. The tartrate is dissolved in a small amount of water, neutralized with sodium carbonate and shaken with ether. The ether layer is washed with water and evaporated. The residue is recrystallized from ether to give dextro-2-(2-naphthyl)-2-methylaminoethanol (5.3 g) as crystals melting at 102° to 104°C. $[\alpha]_D^{22}$ +67.6 ± 1.0° ($CH_3OH$, $c$=1.05 percent).

The methanolic mother liquor is evaporated to dryness, and the residue is dissolved in water, neutralized with sodium carbonate and shaken with ether. The ether layer is evaporated to dryness, and the residue is mixed with an equimolecular amount of dextro-tartaric acid. The resultant mixture is treated similarly to give levo-2-(2-naphthyl)-2-methylaminoethanol dextro-tartrate, which is treated with sodium carbonate to give levo-2-(2-naphthyl)-2-methylaminoethanol (5.5 g) as crystals melting at 102° to 104°C. $[\alpha]_D^{22}$ −67.1 ± 1.0° ($CH_3OH$, $c$=1.11 percent).

b. A solution of dextro-2-(2-naphthyl)-2-methylaminoethanol (2.1 g) in thionyl chloride (20 ml) is sealed in a tube and heated at 90°C for 4 hours. The reaction mixture is evaporated under reduced pressure to dryness, and the residue is recrystallized from methanol/acetone to give levo-N-methyl-2-chloro-1-(2-naphthyl)ethylamine hydrochloride (2.0 g) as crystals melting at 208° to 210°C (decomp.). $[\alpha]_D^{24}$ −30.6 ± 0.6° ($CH_3OH$, $c$=1.099 percent).

c. A solution of levo-N-methyl-2-chloro-1-(2-naphthyl)aziridine hydrochloride in 20 percent potassium hydroxide/methanol solution (15 ml) is refluxed for an hour under an argon atmosphere. The reaction mixture is evaporated under reduced pressure to dryness under a nitrogen atmosphere. The residue is mixed with a small amount of water and shaken with ether. The ether layer is dried over anhydrous potassium carbonate and evaporated. The residue is recrystallized from n-hexane to gie dextro-1-methyl-2-(2-naphthyl)aziridine as crystals melting at 73° to 74°C. The yield is 70 to 75 percent, confirmed by the gas chromatography. $[\alpha]_D^{23}$ +155.4 ± 1.6° ($CH_3OH$, $c$=1.157 percent).

EXAMPLE 7

1-Methyl-2-(2-naphthyl)aziridine (0.5 g) is dissolved in purified sesame oil to give a solution (100 ml). The solution is filtered aseptically with a membrane filter (pore size: below 0.22 $\mu$), sterilized and poured into 50 ampoules (volume, 2 ml) in a nitrogen atmosphere, and the ampoules are sealed. Each ampoule contains 1-methyl-2-(2-naphthyl)aziridine (10 mg) as an active ingredient.

EXAMPLE 8

To a solution of Nikkol HCO-60 (a trade mark of a surfactant, polyoxyethylene castor oil derivative, made by Nikko Chemicals Co., Ltd.)(10 g) in water for injection (80 ml), L-arginine (0.5 g) and sodium chloride (0.6 g) are added to give a solution. A solution of dextro-1-methyl-2-(2-naphthyl)aziridine (0.5 g) in ethanol (1 ml) is added dropwise thereto with stirring. The resultant mixture is adjusted with dilute hydrochloric acid to pH 9.5 and mixed with water for distillation to make a solution (100 ml). The solution is filtered aseptically with a membrane filter (pore size: below 0.22 $\mu$), sterilized and poured into 50 ampoules (volume, 2 ml) in a nitrogen atmosphere, and the amoules are sealed. Each ampoule contains dextro-1-methyl-2-(2-naphthyl)aziridine (10 mg) as an effective ingredient.

EXAMPLE 9

1-Methyl-2-(2-naphthyl)aziridine (4 g) is dissolved in purified sesame oil to give a solution (100 ml). The solution is sealed in 400 soft gelatin capsules so as to contain 0.25 ml of the solution in each capsule. The capsules are coated with an enteric film. Each ampoule contains 1-methyl-2-(2-naphthyl)aziridine (10 mg) as an active ingredient.

What is claimed is:

1. Dextro-1-methyl-2-(2-naphthyl)aziridine.

* * * * *